United States Patent [19]

Arima

[11] 4,057,290

[45] Nov. 8, 1977

[54] VEHICLE OCCUPANT RESTRAINING BELT ARRANGEMENT

[75] Inventor: Tatsuhiro Arima, Fujisawa, Japan

[73] Assignee: Nissan Motor Co., Ltd., Yokohama, Japan

[21] Appl. No.: 709,215

[22] Filed: July 27, 1976

[30] Foreign Application Priority Data

Sept. 8, 1975  Japan .......................... 50-123700[U]

[51] Int. Cl.² ............................................. A44B 11/12
[52] U.S. Cl. ......................................... 297/389; 24/75
[58] Field of Search ............................. 297/385–389; 24/75

[56] References Cited

U.S. PATENT DOCUMENTS

| | | | |
|---|---|---|---|
| 3,287,061 | 11/1966 | Nicholas | 297/385 |
| 3,532,361 | 10/1970 | Hrynik | 297/389 X |
| 3,667,807 | 6/1972 | Beeson | 297/389 |
| 3,929,351 | 12/1975 | Fricko | 297/389 X |
| 3,941,419 | 3/1976 | Blom | 297/389 |

FOREIGN PATENT DOCUMENTS

| | | | |
|---|---|---|---|
| 2,323,791 | 5/1973 | Germany | 297/389 |
| 1,172,458 | 12/1969 | United Kingdom | 297/389 |

Primary Examiner—Francis K. Zugel
Attorney, Agent, or Firm—Fleit & Jacobson

[57] ABSTRACT

A vehicle occupant restraining belt arrangement includes a female buckle and a male latch member slidably receiving an intermediate portion of a strip of webbing having its both ends fixed with respect to the vehicle body to define shoulder and lap belt portions. A slide member is adjustably mounted on an intermediate portion of the strip of webbing between the latch member and the lower end of the strip to prevent the latch from dropping onto the vehicle floor when the belt arrangement is not in use. The slide member is formed with a slit adapted to receive a free end of the latch member to retain the latch member in parallel to the strip of webbing.

4 Claims, 3 Drawing Figures

U.S. Patent    Nov. 8, 1977    4,057,290
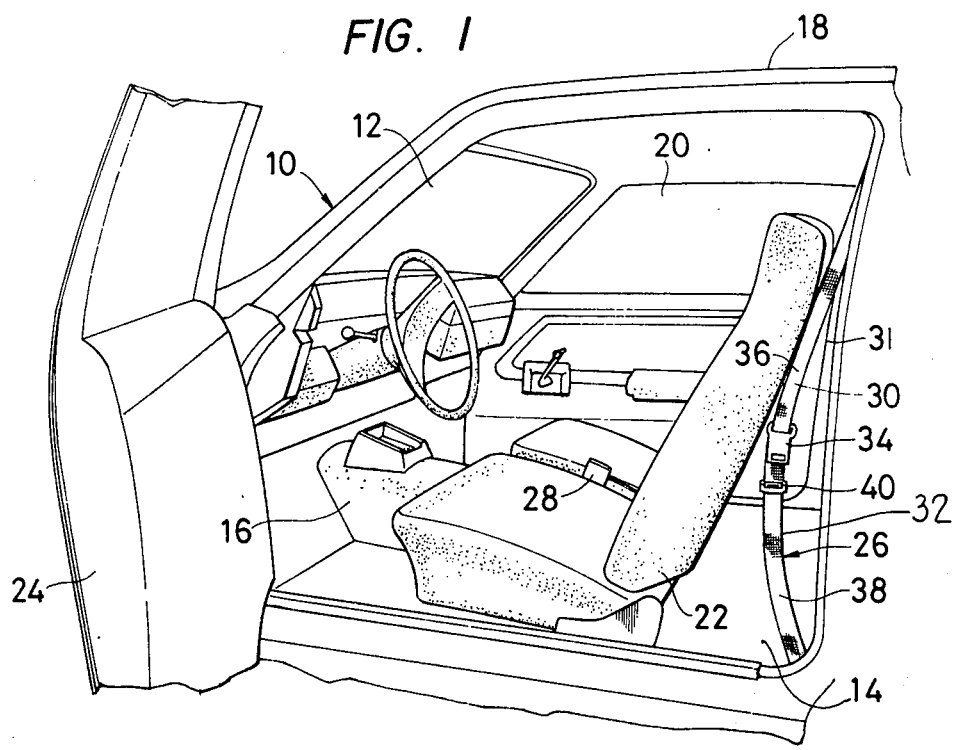
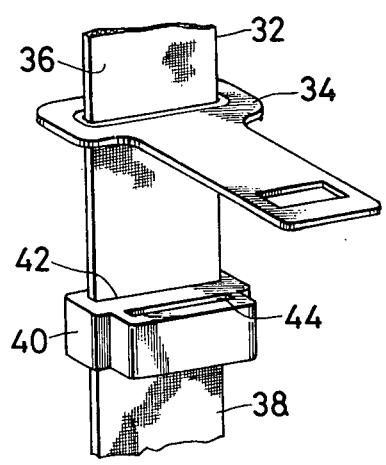
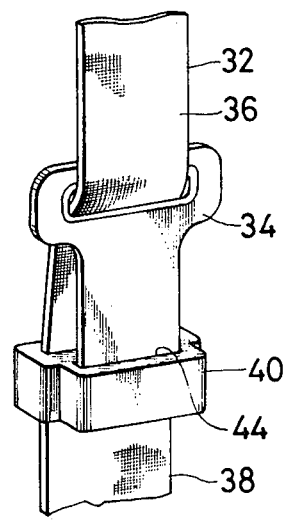

VEHICLE OCCUPANT RESTRAINING BELT ARRANGEMENT

The present invention relates to a vehicle occupant restraining belt arrangement.

It is known to provide a vehicle occupant restraining belt arrangement in which a strip of webbing has one end fixed to a vehicle body floor adjacent outboard of a vehicle seat and other end carried by an inertia retractor mounted on a vehicle body pillar adjacent outboard of the vehicle seat, a male latch plate slidably receives an intermediate portion of the strip of webbing to define shoulder and lap belt portions, respectively, and a buckle secured to vehicle body floor inboard of the vehicle seat. The buckling operations by inserting the latch plate to within the buckle to be secured thereby, causes the shoulder belt portion and the lap belt portion to be positioned across an occupant of the vehicle seat. It is also known to provide a slide member on the strip of webbing between the male latch plate and the end fixed to the vehicle body floor to limit downward movement of the male latch plate along the strip of webbing when the occupant restraining belt arrangement is not in use. This occupant restraining belt arrangement has problems when not in use that since a free end of the male latch plate is not covered nor held parallel to the strip of webbing, there is the possibility that it may injure vehicle occupant and this does not look well.

The present invention aims at solving the problems mentioned above by providing an improved means for limiting downward movement of the male latch member.

It is therefore an object of the present invention to provide a vehicle occupant restraining belt arrangement in which a male latch member slidably receiving an intermediate portion of a strip of webbing is stored appropriately when the occupant restraining belt arrangement is not in use.

Other objects and advantages of the present invention will become apparent from the following description in connection with the accompanying drawings, in which:

FIG. 1 is a view of a portion of a vehicle body whose door is shown in open position and which includes a vehicle occupant restraining belt arrangement according to the present invention shown in a non use position;

FIG. 2 is a portion of FIG. 1 showing a male latch plate in unstored position; and FIG. 3 is a similar view showing the male latch plate in stored position.

Referring now to the drawings, a vehicle body generally designated by 10 includes a windshield 12, a floor 14 with a conventional transmission tunnel 16 and a roof 18 that cooperate to define an occupant compartment 20. A conventional vehicle seat 22 is mounted within the occupant compartment 20 in the usual manner and is accessible through a vehicle door opening selectively opened and closed by a vehicle body door 24 whose front edge is pivotally mounted to the vehicle body 10 in the conventional manner.

An occupant restraining belt arrangement is generally indicated by 26 and includes a female buckle 28 fixed to a portion adjacent a lower inboard portion of the seat 22, and a strip of webbing 30 having an upper end received by a conventional inertia retractor, not shown, fixedly mounted on a vehicle body pillar 31 and on a portion adjacent an upper outboard portion of the back of seat 22 and having a lower end secured to the vehicle floor 14 generally below the upper end by an attachment, not shown. A latch member or plate 34 slidably receives an intermediate portion of the strip of webbing 32 to define shoulder and lap belt portions 36 and 38, respectively, when the male latch plate 34 is inserted to within the female buckle 28 to be secured thereby. The buckling operation causes the shoulder belt portion 32 and the lap belt portion 38 to be positioned across an occupant, not shown, of the seat 22.

A slide member 40 slidably receives with a suitable resistance an intermediate portion of the strip of webbing 32 between the male latch plate 34 and the lower end of the strip of webbing to limit downward movement of the male latch plate 34 toward the lower end, to say in other words, to prevent the latch plate 34 from dropping onto the vehicle floor 14 when the occupant restraining belt arrangement is not in use. The slide member 40 is made of a synthetic resin and is formed with an eye 42 through which the strip of webbing 32 could pass with a suitable force and with a slot 44 adapted to receive a free end of the male latch plate 34. The slot 44 and eye 42 are in substantially parallel relationship. As shown in FIG. 3 when the occupant restraining belt arrangement 26 is not in use the free end of the latch plate 34 is received in the slot 44 of the slide member 40 to be held in substantially parallel to the strip of webbing 32.

What is claimed is:

1. In a vehicle occupant restraining belt arrangement:
   a strip of webbing;
   a male latch plate adapted to be inserted within a female buckle, said male latch plate having an opening through which said strip of webbing is slidably disposed, said male latch plate having one end formed with said opening and an opposite end;
   means for limiting movement of said male latch plate in one direction along said strip of webbing beyond a predetermined position on said strip of webbing, said limiting means comprising a slide member having an eye means for receiving said strip of webbing with suitable resistance for slidably positioning said slide member on said strip of webbing, said slide member further comprising slot means for receiving the opposite end of said male latch plate to hold said male latch plate substantially parallel to said strip of webbing.

2. A vehicle occupant restraining belt arrangement as claimed in claim 1 wherein said slot means comprises a slot substantially parallel to said eye means.

3. In a vehicle occupant restraining belt arrangement:
   a strip of webbing having an upper end and a lower end, said lower end secured to the vehicle floor, said strip of webbing extending substantially vertically, with respect to the vehicle, when the vehicle occupant restraining belt arrangement is not in use;
   a male latch plate adapted to be inserted within a female buckle, said male latch plate having an opening through which said strip of webbing is slidably disposed, said male latch plate having one end formed with said opening and an opposite end;
   a slide member slidably mounted on said strip of webbing and positioned between said male latch plate and said lower end of said strip of webbing, said slide member engageable with said male latch plate to prevent downward movement of said male latch plate along said strip of webbing toward said lower end, said slide member having an eye through which said strip of webbing is slidably disposed with suitable resistance for slidably positioning said slide member on said strip of webbing and slot means for receiving the opposite end of said male latch plate to hold said male latch plate substantially parallel to said strip of webbing.

4. A vehicle occupant restraining belt arrangement as claimed in claim 3 wherein said slot means comprises a slot substantially parallel to said eye.

* * * * *